United States Patent [19]
Wante

[11] Patent Number: 4,787,669
[45] Date of Patent: Nov. 29, 1988

[54] SEMI-TRAILER PLATFORM

[75] Inventor: Guy Wante, Pas-de-Calais, France

[73] Assignee: Benalu S.A., Pas-de-Calais, France

[21] Appl. No.: 55,936

[22] Filed: Jun. 1, 1987

[30] Foreign Application Priority Data

Feb. 20, 1987 [FR] France .................. 87 02725

[51] Int. Cl.⁴ .................................. B62D 21/02
[52] U.S. Cl. .................... 296/182; 296/204; 280/789; 105/422
[58] Field of Search ............ 296/204, 182, 181; 280/789; 105/422

[56] References Cited

U.S. PATENT DOCUMENTS

| | | |
|---|---|---|
| 1,493,736 | 5/1924 | Collins . |
| 3,481,643 | 12/1969 | Campbell . |
| 3,856,344 | 12/1974 | Loeber .................. 280/789 |
| 4,226,465 | 10/1980 | McCullough .......... 296/182 |
| 4,262,961 | 4/1981 | Schmidt ................ 296/182 |
| 4,534,589 | 8/1985 | Booher .................. 296/204 |
| 4,564,233 | 1/1985 | Booher .................. 296/182 |

FOREIGN PATENT DOCUMENTS 1052830  3/1959  Fed. Rep. of Germany .

Primary Examiner—Robert R. Song
Attorney, Agent, or Firm—Sandler & Greenblum

[57] ABSTRACT

This straight frame semi-trailer platform is adapted to receive a floor for supporting a body of a transport vehicle. The platform comprises an assembly of cross members and longitudinal members, the longitudinal members including intermediate members and side members. The side members consist of channel sections having a lower flange. The cross-sectional contour of the cross members (3) comprises a bottom area (21) adapted to bear flat on, and to be secured to, the lower flange (8) of the side members (6).

17 Claims, 2 Drawing Sheets

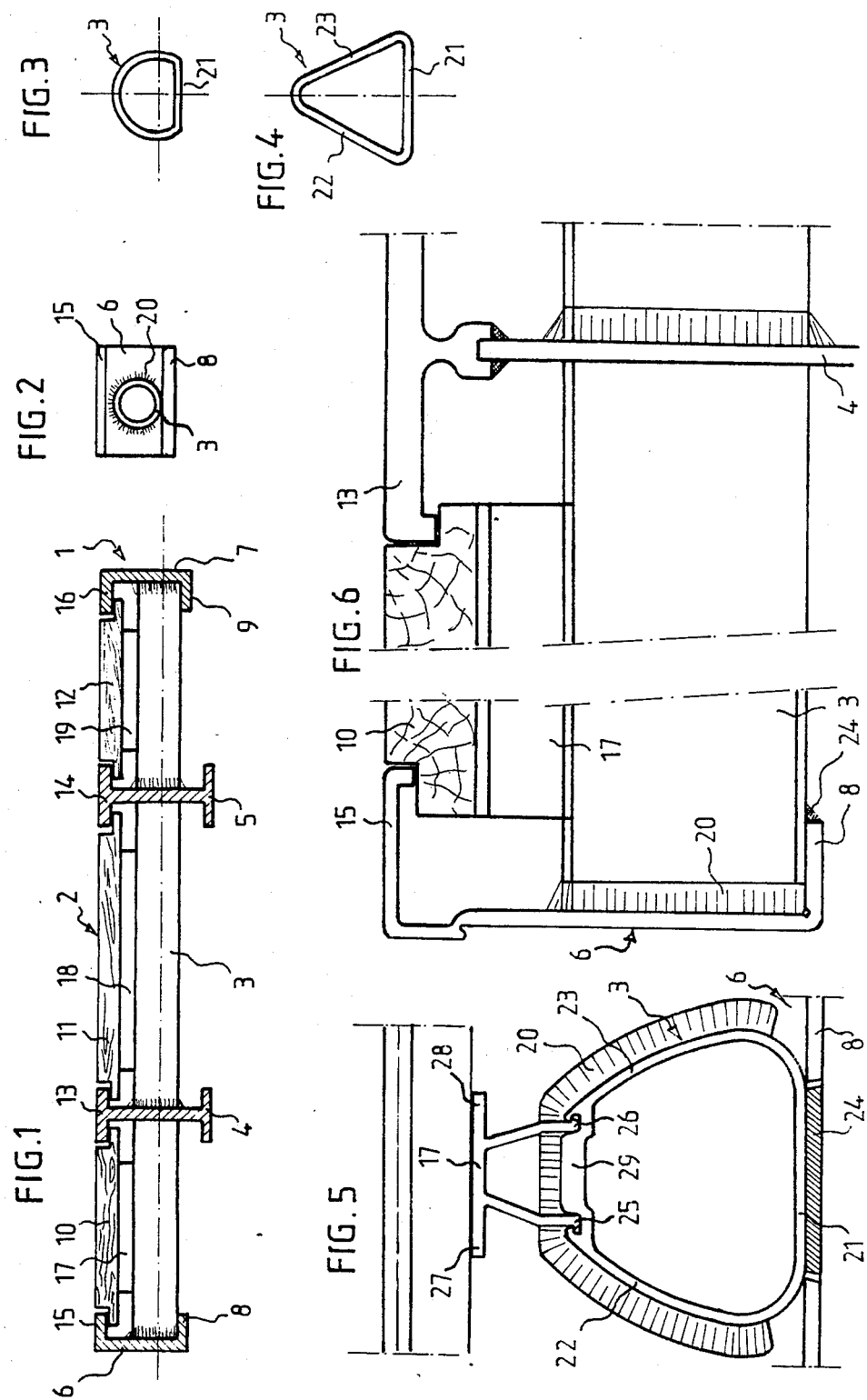

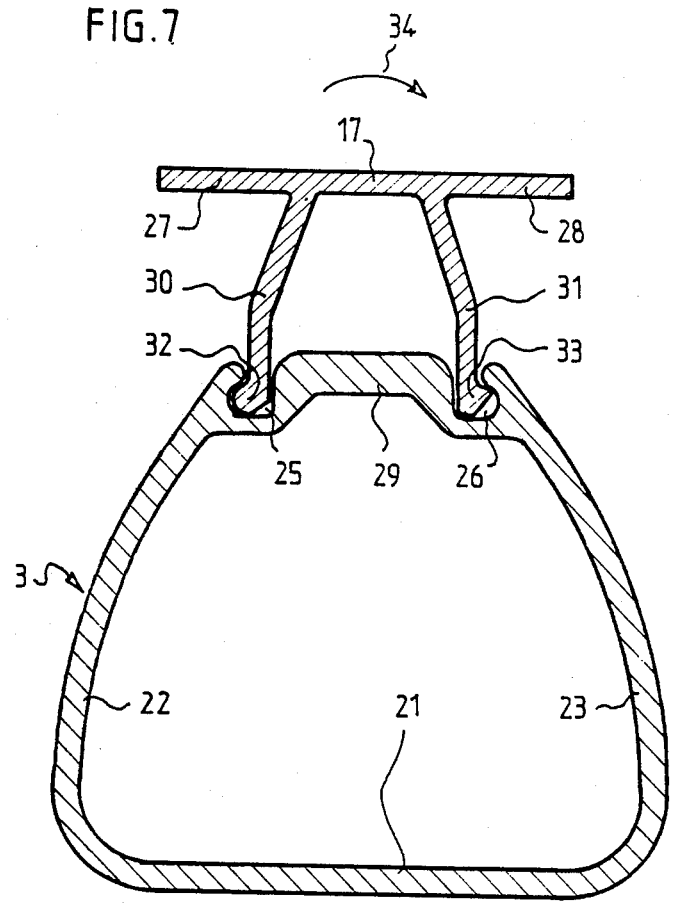

SEMI-TRAILER PLATFORM

BACKGROUND OF THE INVENTION

The present invention relates to an improved semi-trailer platform construction and notably to the construction of commercial vehicles for transporting goods.

1. Field of the Invention

The semi-trailer platform according to the present invention is so constructed as to constitute a straight frame of the semi-trailer, to which the axles and body are secured. The floor is fixed directly to the platform for supporting the goods.

2. The Prior Art

In conventional semi-trailers the platform consists as a rule of an assembly of interlocked longitudinal members and cross members and cross members made chiefly of steel, due to its good mechanical properties and relatively low cost. Another advantageous property of steel is that it is weldable and that the welds are capable of withstanding severe mechanical stresses. However, steel structures are objectionable for various reasons.

Firstly, steel has a poor corrosion resistance and must be protected by means of expensive surface treatments of limited efficiency and duration. Besides, corrosion is inasmuch important as the resistance to corrosion is an essential factor in the useful life of the frame structures. Furthermore, the detrimental effects of corrosion tend to increase with the generalization of the use of salt for de-icing roads.

Another inconvenience of steel is its weight. In fact, it is quite obvious that in the transport of goods it is more advantageous to have the lightest possible supporting structure in order to cut fuel costs. From this specific point of view, steel is rather uneconomical and therefore in direct competition with aluminum or aluminum alloys which offer many advantageous features.

Aluminum has a very good corrosion resistance even in the absence of any particular treatment, and its new alloys display considerably improved mechanical properties. Moreover, due to recent developments in welding techniques aluminum and light alloys can now be used satisfactorily in mechanically welded structures such as those used in the construction of straight frame semi-trailers.

As a matter of fact, in this specific field a rather popular type of straight frame semi-trailer platform comprises cross members interlocked with longitudinal members of which the outermost ones consist of channel sections having shaped edges and a lower stiffening flange. These section members are obtained by extrusion and as a rule the various component elements are assembled by welding.

At the present time, the frame cross members have a circular cross-section. This solution was chosen notably because it is much easier to machine a circular-sectioned member. However, in actual practice it was found that this type of cross member is attended by many inconveniences.

These inconveniences are observed more particularly in the areas where the ends of the cross members are connected to the side members where the fixing operation is difficult to perform and the stresses transmitted to the body are considerable. In fact, the lower flanges of these side members are more or less in the way when attempting to make a continuous weld bead. Under these conditions, only the upper portion of the end of the cross-member is connected to the side member. The circular cross-section of the cross member which bears on the lower flange of the longitudinal member reduces the surface of the tangent area to barely one point, hence the great fragility in this area and this is inasmuch detrimental as this point lies in a particularly stressed area.

Many failures have been recorded in this area due to the absence of any reliable bond between the lower portion of the cross member and the side member.

Another inconvenience of this circular cross-sectional contour is that its moment of inertia is far from its optimal value, considering the mass of material involved and the direction of the various stresses developed therein.

SUMMARY OF THE INVENTION

It is the essential object of the present invention to provide a straight frame semi-trailer reinforced considerably in comparison with present constructions, this result being obtained without increasing the weight of the structure. More particularly, the cross members are secured to the lateral longitudinal members in such a way that the stresses are distributed throughout the circumference of the cross member, so that a particularly good stress-absorbing capacity is obtained.

Besides, the construction of the straight frame semi-trailer is facilitated by the fact that each cross member is positioned automatically about its longitudinal axis with a high degree of precision, that the floor-supporting section members are consequently properly oriented, that the weld beads interconnecting the cross members and the longitudinal members can be reduced to just the necessary length. In addition, it may be pointed out that, in contrast to a circular-sectioned extruded member frequently attached by misalignment of a same generatrix (twist), which is a more or less regular torsional distortion of the extruded section as it emerges from the die, the improved cross-member section according to the present invention is obtained directly by extrusion with a very small torsional tolerance since its particular configuration permits of limiting the undesired twist to a value much lower than prior art values and amply sufficient for the purpose.

With the present invention it is much easier to connect the cross members to the longitudinal side members, and furthermore fixing the cross members to the intermediate longitudinal members is greatly facilitated due to the access areas resulting from the particular structure provided by the present invention, which permits of forming continuous weld beads.

Other objects and advantages of the present invention will appear as the following description proceeds with reference to the accompanying drawings.

According to the present invention, the straight frame semi-trailer platform intended for supporting the body of a transport vehicle, and consisting of an assembly of cross members and longitudinal members of the frame of which the side members consist of channel sections having a lower flange, is characterized in that the cross-sectional contour of the cross members comprises an area adapted to bear flat on the lower flanges of said side members.

THE DRAWINGS

FIG. 1 is a diagrammatic cross-sectional view showing the platform of a straight frame semi-trailer, FIG. 2 shows the connection between a cross member of conventional design and a side member, FIG. 3 shows diagrammatically the cross-sectional contour of a cross member according to the present invention, FIG. 4 illustrates a modified form of embodiment of the cross member of the present invention, FIG. 5 illustrates diagrammatically the connection between a cross member and a side member of the straight frame or platform of the semi-trailer, FIG. 6 is a diagrammatic cross-sectional view illustrating the structure of the straight frame semi-trailer platform of the present invention, and FIG. 7 is a cross-sectional view showing the cross member of the present invention provided with a clip-on bracket for supporting the floor elements.

DESCRIPTION OF THE PREFERRED EMBODIMENTS

The present invention is directed to provide an improved straight frame semi-trailer platform and is applicable notably to the construction of commercial vehicles, especially for transporting goods.

More particularly, the straight frame semi-trailer platform of the present invention is adapted to support the body and to be supported by axles. Although the present invention has been developped with particular reference to road transport vehicles, it is obvious that it is also applicable to railroad vehicles.

At the present time, straight frame semi-trailer platforms consist mainly of crossed longitudinal members and cross members made of steel and assembled by welding. In addition to the well-known good mechanical properties of steel, this material is adopted chiefly on account of its relatively low cost. Now it is clear that steel structures suffer from various inconveniences, notably from the dual point of view of corrosion and specific weight.

On the other hand, in this particular domain, the performances of aluminum and its alloys are definitely superior, and account for the increasing trend to use this material in the construction of modern semi-trailers.

However, when using aluminum and/or its alloys the major difficulties are found when welding the cross members to the side members of the frame. In fact, for reasons of machining convenience, most cross members have a circular cross-section which is ill-suited for obtaining an unbroken weld bead in the flange area of the side members. More particularly, the lower portion of the cross member has a weakened area since it is not connected to the side member, and this weakened area just happens to be a particularly stressed one in actual service. As a consequence, accidental failures are recorded which are extremely detrimental to semi-trailers.

Now it is the essential object of the present invention to reinforce this particular connection and also to facilitate the general construction of the platform of a straight-frame semi-trailer.

Referring now to the drawings, FIG. 1 is a diagrammatical cross-sectional view of the straight frame platform of a semi-trailer of conventional design. The top of this platform 1 is provided with a floor 2 adapted to support the goods to be transported. The platform 1 is also adapted to support a body structure, that is, lateral walls for constituting the sideboards of the semi-trailer.

The straight frame structure 1 of the semi-trailer comprises an assembly of cross members 3 and intermediate longitudinal members 4, 5. The intermediate longitudinal members 4, 5 have suitable apertures formed therein to permit the passage of the cross member 3 through their central webs. The intermediate longitudinal members 4, 5 have an I-shaped cross-sectional configuration in order to increase their moment of inertia.

The lateral edges of platform 1 are lined by channel-sectioned side members 6, 7 provided with lower flanges 8, 9 to improve their rigidity.

The floor 2 of the platform consists of covering elements 10, 11 and 12, generally of wood, which are held in position by the upper flanges 13, 14 of longitudinal members 4, 5 and by the upper flanges 15, 16 of side members 6, 7.

These covering or floor elements 10, 11 and 12 are supported by cross members 3 with the interposition of substantially U-shaped clip-on brackets 17, 18 and secured to cross members 3.

FIG. 2 illustrates the conventional method of connecting a circular-sectioned cross member 3 to a side member 6.

This connection is obtained by depositing a weld bead 20 along the periphery of the end of cross member 3. However, for obvious lack of accessibility, up to now the weld bead 20 was unable to cover the complete circumference of cross member 3, due to the presence of the lower flange 8 of longitudinal member 6 which prevents the access to the joint formed between these two members.

Therefore, this connection is particularly weak in the lower portion of cross member 3. It may also be pointed out that the contact surface between the flange 8 of side member 6 and the cylindrical surface of cross member 3, is limited to a single point of tangential contact which of course is too small to provide an efficient bond between cross member 3 and flange 8.

According to the essential feature characterising the present invention, the semi-trailer platform comprises cross members 3 having a specific cross-sectional contour and more particularly a portion whereby this cross member can bear flat on the underlying flange of the adjacent side member. A typical example of this cross-sectional contour is illustrated in FIG. 3 showing a cross-member 3 having a flat base portion or bottom 21 providing a relatively wide contact area whereby an efficient connection can be obtained by depositing for example a weld bead between the cross member and the longitudinal member.

The adoption of this cross-sectional contour provides other advantageous features from the constructional point of view since the various component elements can be easily positioned preliminarily to the assembling step. In fact, the flat bottom 21 prevents the cross member 3 from rotating in the corresponding apertures formed in the intermediate longitudinal members 4 and 5, and besides the mutual contact between the lower flanges 8, 9 of side members 6, 7 and the flat bottom 21 of cross members 3 facilitates the proper positioning of the side members.

While preserving the advantages resulting from the presence of a flat bottom 21 as described hereinabove, the preferred cross-sectional contour is substantially polygonal with rounded corners. This shape is also advantageous in that, given an equal cross-sectional area, the moment of inertia of the cross member 3 is increased and this cross member has a greater rigidity and can carry considerably greater loads.

The cross-sectional contour of the cross member 3 shown in FIG. 3 can be further improved by providing two flat or curvilinear converging bearing surfaces 22, 23, as illustrated in FIG. 4 or 5, so as to obtain a substantially triangular configuration.

Firstly, these flat or curved converging surfaces 22, 23 facilitate the centering of cross member 3 in the corresponding bores or apertures of longitudinal members 4, 5 even when the platform is assembled in an upside-down position. Moreover, the two converging flat bearing areas 22 and 23 are somewhat spaced from the top flanges 13 and 14 of longitudinal members 4 and 5 so that it is much easier to form the weld bead therebetween.

FIGS. 5 and 6 are a cross-sectional view and a longitudinal view, respectively, showing the assembling of a cross member according to a preferred form of embodiment of the invention.

The cross-sectional contour of cross member 3 is advantageously nearly triangular and substantially equilateral, the flat bottom base and the other two converging sides 22, 23 being slightly curvilinear.

Besides, it will be seen that the weld bead 20 connecting the end of cross member 3 to the bottom flange of side member 6 is reinforced by forming a weld bead 24 between the end of the lower flange 8 of side member 6 and the bottom side 21 of cross member 3. The increment in mechanical strength resulting from this particular arrangement is inasmuch important as the connection takes place at the end of the lower flange 8 of channel section or side member 6, so that a lever arm corresponding to the length of said lower flange 8 is obtained which reduces accordingly the strain in weld bead 24.

The perfect accessibility available when making the weld beads 20 and 24 is also clearly apparent.

The clip-on brackets 17 for fixing the floor elements 10 to cross members 3 are anchored to these cross members 3 by engaging relatively closely-spaced grooves 25, 26 formed between the two converging bearing areas 22 and 23. Each clip-on bracket 17 comprises a pair of opposite overhanging wings 27, 28 for improving the floor stability.

A first form of embodiment of the clip-on bracket 17 is illustrated in FIG. 5. Underneath the overhanging wings 27, 28 a pair of symmetrical fixing lugs 30, 31 are provided and adapted to snappily engage with their somewhat enlarged ends a pair of grooves 25, 26 formed in cross member 3, this bracket having a substantially π-shaped cross-section.

In a second form of embodiment illustrated in FIG. 7, the same π-shaped cross-sectional configuration is also obtained, together with the wings 27, 28 and the fixing lugs 30, 31. However, these lugs 30, 31 are slightly asymmetrical, the end 32 of lug 30 constituting with the matching groove 25 a kind of hinge and the snap engagement between the bracket 17 and the cross member 3 is obtained by rotating the bracket in the direction of the arrow 34, until the end 33 of lug 31 is locked in the corresponding groove 26.

These forms of embodiment are advantageous compared with those in which the ends of lugs 30, 31 are simply fitted in grooves 25, 26 because the vibration generated by the semi-trailer in actual service might cause the brackets 17 to be released from the corresponding cross member, notwithstanding the pressure exerted by the floor and by the load carried thereby. Under these conditions, a weld spot between the brackets 17 and cross members 3 would avoid this inconvenience and save the extra labor resulting therefrom.

Besides, the top wall 29 of cross member 3 is preferably thicker between grooves 25 and 26 in order to improve the rigidity of the structure.

I claim:

1. A vehicle platform for supporting a vehicle body, said platform comprising:
   an assembly of cross members, intermediate longitudinal members, and longitudinal side members, wherein each of said side members comprises a lower flange, wherein each of said cross members comprises a substantially polygonal cross-sectional shape comprising a lower area which is adapted to be positioned flat against a respective one of said lower flanges of a respective one of said side members, wherein said cross members intersect with said intermediate longitudinal members, and wherein at areas of intersection between respective ones of said cross members and intermediate members, said cross members comprise at least two converging bearing areas.

2. A vehicle platform according to claim 1, wherein said lower flanges of said longitudinal side members comprise respective ends, and wherein said lower area of each of said cross members, which is adapted to be positioned flat against a respective one of said lower flanges of a respective one of said longitudinal side members, is adapted to be secured to a respective end of one of said respective lower flanges of one of said respective logitudinal side members.

3. A vehicle platform according to claim 2, further comprising a first weld bead connecting an end of a respective one of said lower flanges and of a respective one of said longitudinal side members to a respective one of said lower areas of a respective one of said cross members.

4. A vehicle platform according to claim 3, wherein each of said cross members comprises an end which connects to a respective area of a respective one of said longitudinal side members, further comprising a second weld bead connecting said ends of said cross members to each of said respective areas of said respective longitudinal side members.

5. A vehicle platform according to claim 4, wherein said longitudinal side members comprise channel-section longitudinal side members, wherein said ends of said cross members are positioned upon respective ones of said lower flanges of said channel-section longitudinal side members, and wherein said first weld beads are spaced from respective ones of said second weld beads.

6. A vehicle platform according to claim 1, wherein said substantially polygonal cross-sectional shape of each of said cross members comprises a flat-bottomed portion.

7. A vehicle platform according to claim 1, wherein said substantially polygonal cross-sectional shape of said cross members is a substantially triangular shape having rounded corners.

8. A vehicle platform according to claim 7, wherein each of said cross members comprises a vertex comprising a reinforcing portion thicker than other portions of each of said cross members.

9. A vehicle platform according to claim 7, wherein said substantially triangular cross-sectional shape is substantially equilateral.

10. A vehicle platform according to claim 7, wherein each of said cross members comprises an upper surface, said vehicle platform further comprising a floor, and respective cross members having attached thereto on each of said respective upper surfaces, at least one bracket for supporting said floor.

11. A vehicle platform according to claim 10, further comprising a plurality of grooves located in said upper surface of each of said cross members for affixing each of said brackets to respective cross members between two of said converging bearing areas thereof.

12. A vehicle platform according to claim 11, wherein said bracket comprises a pair of asymmetrical fixing lugs, one of said lugs comprising a lower end adapted to hingedly connect said bracket to a respective one of said cross members through its connection with one of said plurality of grooves, and wherein another of said lugs comprises a lower end adapted to lock said bracket to said respective one of said cross members through its engagement with another of said plurality of grooves.

13. A vehicle platform according to claim 12, wherein said upper surface comprises an area between said grooves, said area comprising a reinforcing area which is thicker than other areas of said cross members.

14. A vehicle platform according to claim 10, wherein said at least one bracket comprises a clip-on bracket.

15. A vehicle platform according to claim 10, wherein said at least one bracket comprises an upper portion adapted to contact said floor, said upper portion comprising a pair of substantially horizontal, oppositely projecting wings.

16. A vehicle platform according to claim 10, wherein said bracket is substantially $\pi$-shaped.

17. A vehicle platform according to claim 1, wherein the vehicle platform is a substantially straight frame semi-trailer vehicle.

* * * * *